| United States Patent [19] | [11] Patent Number: 4,611,576 |
| Stephens et al. | [45] Date of Patent: Sep. 16, 1986 |

[54] SOLAR ENERGY COLLECTOR

[76] Inventors: Ceacer O. Stephens; George Spector, both of 233 Broadway, RM 3615, New York, N.Y. 10007

[21] Appl. No.: 659,833

[22] Filed: Oct. 11, 1984

Related U.S. Application Data

[63] Continuation-in-part of Ser. No. 409,617, Aug. 19, 1982, abandoned.

[51] Int. Cl.[4] .............................................. F24J 2/08
[52] U.S. Cl. .................................... 126/440; 126/444
[58] Field of Search ........................ 126/432, 440, 444

[56] References Cited

U.S. PATENT DOCUMENTS 1,599,481  9/1926  Marcuse ............................. 126/440
4,509,502  4/1985  Youcha .............................. 126/440

FOREIGN PATENT DOCUMENTS 2451791   5/1976  Fed. Rep. of Germany ...... 126/440
2617605  11/1977  Fed. Rep. of Germany ...... 126/440
  14918   2/1976  Japan ................................. 126/440
0014237   2/1977  Japan ................................. 126/440
0146954  11/1981  Japan ................................. 126/440
0162353  12/1981  Japan ................................. 126/440

Primary Examiner—Margaret A. Focarino

[57] ABSTRACT

A solar energy collector is provided and consists of a heat absorbing panel made with a series of lenses throughout its upper surface so that circulating water moving through the interior of the panel below the lenses, can be heated by the rays of the sun.

1 Claim, 5 Drawing Figures

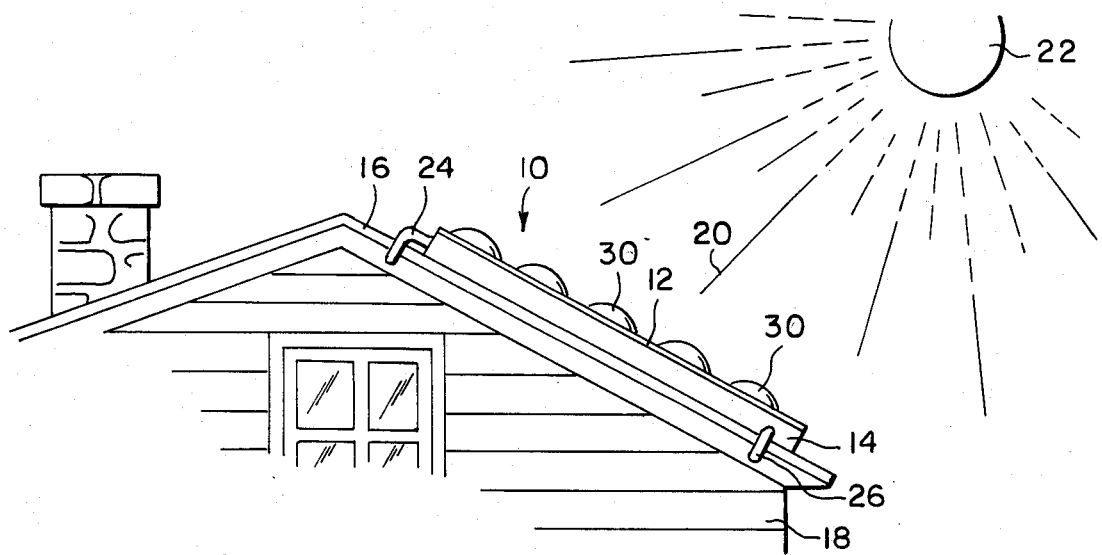
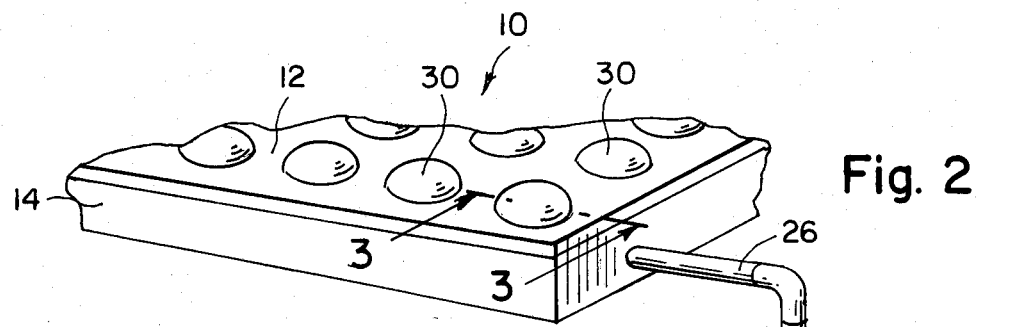
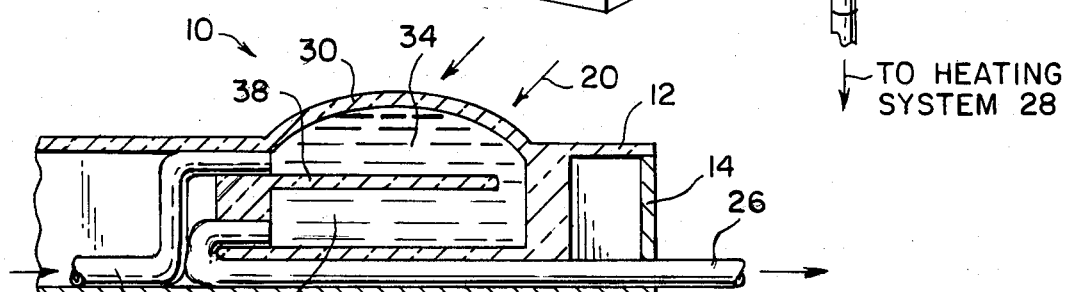
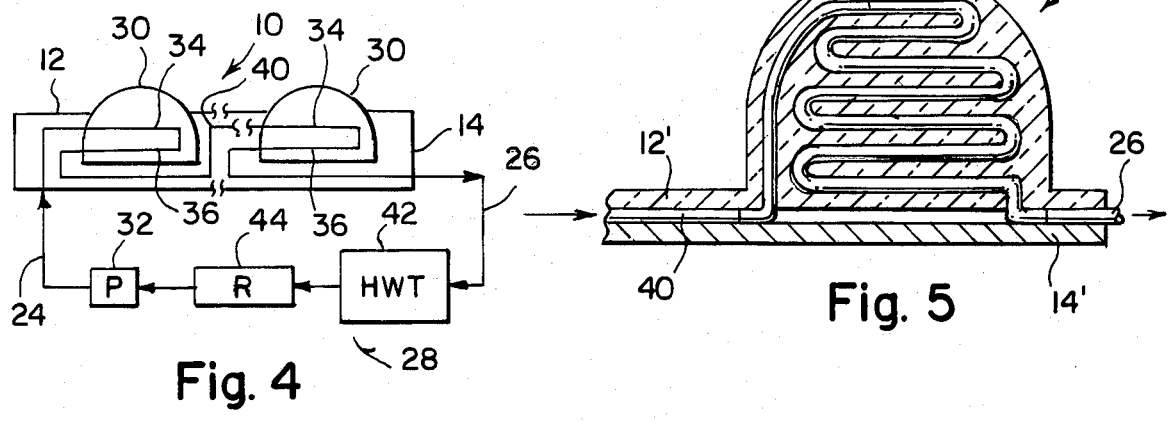

SOLAR ENERGY COLLECTOR

CROSS-REFERENCE TO RELATED APPLICATION

This application is a continuation-in-part of application Ser. No. 409,617 filed Aug. 19, 1982, and now abandoned.

BACKGROUND OF THE INVENTION

The instant invention relates generally to solar heaters and more specifically it relates to a solar energy collector that is usually installed upon a roof of a building, in order that sun rays are used to heat a fluid circulated between the collector and a heating system of the building.

Numerous solar heaters have been provided in prior art that are adapted to use the sun's thermo radiation. For example, U.S. Pat. Nos. 1,599,481; 4,098,263; 4,116,223; 4,194,949; 4,279,244 and 4,341,203 along with Japanese patent Nos. 0046947 and 0162353 all are illustrative of such prior art. While these units may be suitable for the particular purpose to which they address, they would not be as suitable for the purposes of the present invention as heretofore described.

SUMMARY OF THE INVENTION

A principle object of the present invention is to provide a solar energy collector that has a new energy absorption configuration which includes a plurality of magnifying lenses throughout its heat absorbing surface so as to increasingly absorb a larger concentration of the sun's rays.

Another object is to provide a solar energy collector that circulates moving fluid through its interior below the magnifying lenses for increased heat transfer to the fluid.

An additional object is to provide a solar energy collector which in another design thereof includes an increased rounded heating surface for each magnifying lens in order to give the magnifying lenses more exposure time to the sun's rays.

A further object is to provide a solar energy collector wherein the principles thereof should power a heating system of a building.

A still further object is to provide a solar energy collector that is economical in cost to manufacture.

Further object os the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a side elevational view of the invention installed upon a roof of a building, so as to readily receive the rays of the sun.

FIG. 2 is an enlarged fragmentary to perspective view of the invention thereof.

FIG. 3 is an enlarged side cross sectional view taken along line 3—3 in FIG. 2.

FIG. 4 is a diagrammatic view showing how the circulating fluid travels through the lenses of the collector.

FIG. 5 is an enlarged side cross sectional view similar to FIG. 3 of another design of one of the magnifying lenses.

DETAILED DESCRIPTION OF THE PREFERRED EMBODIMENTS

Turning now descriptively to the drawings, in which similar reference characters denote similar elements throughout the several views FIGS. 1 and 2 illustrates a solar energy collector 10 that has a broad heat absorbing panel 12 supported in a frame 14 installed upon a roof 16 of a building 18 so as to be exposed to rays 20 of sun 22. A fluid vehicle such as water enters through an inlet pipe 24 and circulates through the panel 12 in order to become heated up by the rays 20 of the sun 22 striking the panel 12. An outlet pipe 26 leads to a heating system 28. The panel 12 is shown to be comprised with a plurality of magnifying lenses 30 throughout its top surface in order to concentrate the rays 20 for an increased efficiency.

FIGS. 3 and 4 shows how the water circulates through the magnifying lenses 30. The inlet pipe 24 is connected to a pump 32 that pumps the water therethrough to travel into an upper chamber 34 to be heated and then through a lower chamber 38 separated by a transparent partition 38 to receive additional heat below the first lens 30. The heated water than travels via intermediate pipe 40 to the second and subsequent lenses 30 until it leaves by outlet pipe 26 into the heating system 28. The heating system has a hot water heater or storage tank 42 and radiators 44 that feed back into the pump 32.

FIG. 5 shows another design in frame 14 in which each magnifying lens 30' of the panel 12' is upwardly rounded in order to give the magnifying lens more exposure time to the rays 20 of the sun 22. A transparent serpent shaped pipe 46 is imbedded in the lens 30' for communication with inlet pipe 24, outlet pipe 26 and intermediate pipes 40, so that the water can circulate therethrough and be heated.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A solar energy collector which comprises:
   (a) a frame;
   (b) a heat absorbing panel supported in said frame so as to be exposed to sun rays, said panel having a plurality of spaced magnifying lens integral with said panel throughout its top surface in order to concentrate said sun rays for increased efficiency and a plurality of hot water heating areas, each said area encompassed by and contiguous with each said lens, including means for detaining the water at each said lens;
   (c) a water pump in fluid communication with said hot water heating areas of said panel;
   (d) a hot water heating system in fluid communication with said hot water heating area of said panel; and (e) a piping system serially connecting each said lens with said pump and water heating system, wherein said means comprises superimposed upper and lower chambers in each said area through which water circulates in succession, said upper chamber having an inlet and said lower chamber having an outlet, said chambers being separated by a transparent partition having an aperture to cause said water to flow in a zig zag path therethrough to be detained and thus absorb more heat.

* * * * *